May 4, 1948.  R. E. BAUER  2,440,710
MICROMETER HEIGHT GAGE FIXTURE
Filed Oct. 30, 1944
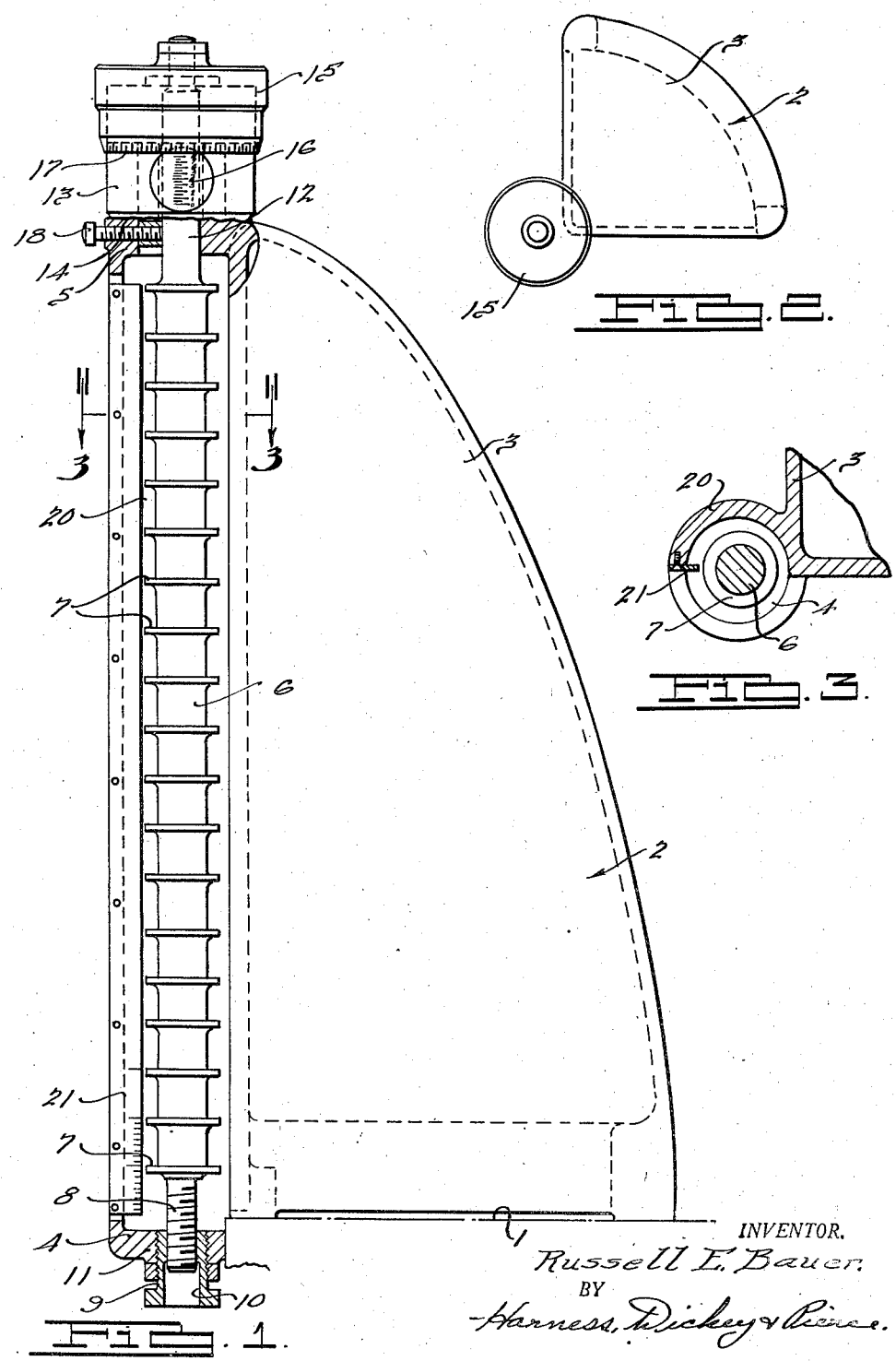
INVENTOR.
Russell E. Bauer,
BY
Harness, Dickey & Pierce.
ATTORNEYS.

Patented May 4, 1948

2,440,710

UNITED STATES PATENT OFFICE 2,440,710

MICROMETER HEIGHT GAGE FIXTURE

Russell E. Bauer, Detroit, Mich., assignor to Cadillac Gage Company, Grosse Pointe Woods, Mich., a partnership Application October 30, 1944, Serial No. 560,977

2 Claims. (Cl. 33—170)

The present invention relates to height gage fixtures.

One of the primary objects of the present invention is to provide a novel height gage fixture adapted for use with a surface plate so that workpieces may be accurately and quickly checked with conventional height gages.

Another object of the invention is to provide a novel height gage fixture of such a construction that the use of conventional gage blocks, used in setting height gages, may be dispensed with.

Other objects of the invention will become apparent from the following specification, the drawings relating thereto, and from the claims hereinafter set forth.

In the drawing, in which like numerals are used to designate like parts in the several views throughout:

Figure 1 is a side-elevational view, with parts broken away and showing parts in section, of a height gage fixture embodying features of the present invention;

Fig. 2 is a top plan view of Fig. 1, on a reduced scale; and

Fig. 3 is a cross-sectional view taken substantially along the line 3—3 of Fig. 1.

Referring to the drawing, the top of a surface plate is indicated at 1. It will be understood that in the use of the height gage fixture of the present invention, the workpiece to be measured is placed upon the surface 1, and the height gage, which may be of a conventional construction, is also placed on the surface 1 in the usual way. The height gage may be of the type having a laterally projecting finger mounted for vertical adjustment, and in the prior practice the height of such finger above the surface plate was set or measured by the use of gage blocks. To measure the height of a workpiece, or to set up the height gage, is a slow process, using such blocks, as it is necessary to select several of a number of such blocks to obtain the correct dimension. This is given by way of example; and other measuring instruments may be used, such as a dial, test indicator mounted on a height gage.

According to the present invention, a height gage fixture, generally indicated at 2, is mounted on the surface plate 1. The fixture comprises an upstanding dome 3, in the form of a quadrant, with the bottom surface thereof resting on the top of the surface plate 1. The dome 3 has lateral, circular projections 4 and 5 adjacent the bottoms and tops thereof, respectively, at the corner, which serve to mount a measuring bar 6 therebetween. A semicircular shield 20 is integral with the dome 3 and extends between projections 4 and 5 so that the bar is exposed on one side.

The measuring bar 6 is circular in cross section and has a plurality of flat, annular projections 7 formed thereon with the top surfaces parallel at precisely spaced intervals. Such intervals are equal and may be, for example, one inch apart. The lower end of bar 6 has a lead screw or thread 8 formed thereon which is threadably received within a threaded opening of a lead nut 9. The lead nut 9 has an enlarged axial opening 10 therethrough within which the threaded end 8 of the bar 6 may extend. The lead nut 9 is threaded into a threaded opening formed in a horizontal portion 11 which is integral with the projection 4. The threads of lead screw 8 may be forty pitch, for example, and the external threads of nut 9 may be twenty pitch, for example.

The upper end of the bar 6 has a reduced diameter, as indicated at 12, and extends upwardly through a tubular member 13. Such member 13 is fixedly mounted to a horizontal portion 14 of the projection 5. The reduced portion 12 extends upwardly through member 13 and is fixed to a cap or thimble 15 for rotation therewith. The thimble 15 is telescopically received over the peripheral surface of member 13. The member 13 has a scale 16 marked thereon, the scale 16 being one inch, for example, in length with suitable division indicia marked thereon. The lower end of thimble 15 is preferably inwardly tapered, with a peripheral scale therearound, and the lower edge thereof is preferably flat, or in a plane normal to the axis of movement of the bar 6, so that as the thimble 15 is rotated with respect to member 13, the position of the scale on the lower edge 17 of the thimble 15 with respect to the scale 16 will indicate the scale reading above zero. When such edge is at the zero position, the lowermost projection 7 is exactly flush with the surface plate 1. By rotation of the thimble 15, the entire bar 6 is rotated with respect to the supporting frame and is moved axially with respect thereto through the action of the lead screw 8 and nut 9 to indicate the extent of movement of all of the projections 7 with respect to the surface plate 1.

A vertical scale 21 is fixed on the edge of portion 20 adjacent the bar 6 so that the approximate height of any one of the projections 7 above the surface plate 1 may be quickly and accurately read, the exact reading being taken from the scale 16 and the scale on portion 17.

The scale 16 is formed on an adjustable insert similar to that disclosed in the copending application of Russell E. Bauer, Serial No. 560,976, filed October 30, 1944. The purpose of the insert is to compensate for any errors in the lead of the lead screw.

In order to fix the bar 6 against axial movement, a set screw 18 is threaded through projection 5 and abuts against the reduced shank 12 of the bar.

In the use of the device above described, the work-piece and the height gage are supported on the surface plate in the usual way. The height gage may be quickly set by first setting the bar 6 to the correct position so that the projection 7 to the nearest inch is displaced axially to the proper extent, according to the setting with respect to scale 16. The finger of the height gage may then be quickly set on the top surface of the proper projection 7 so that it may then be readily moved over the surface plate to a position adjacent the workpiece to check the workpiece.

The device may also be used to give a quick height measurement in that the height gage may first be set to the workpiece to determine its height and then may be moved to the bar 6 and the bar 6 adjusted axially until the finger of the height gage engages the corresponding surface 7. The exact height may then be read according to the particular surface engaged and the reading on scale 16.

Formal changes may be made in the embodiment above described without departing from the invention, the scope of which is commensurate with the appended claims.

What is claimed is:

1. A height gage fixture comprising a supporting member, a bar having a plurality of parallel, flat, annular projecting surfaces integrally formed thereon at precisely spaced intervals therealong, screw means mounting said bar on said member for rotative movement of the bar with respect to the member and along the axis of the bar, and means indicating the extent of such axial movement.

2. A height gage fixture comprising a supporting member, a bar having a plurality of parallel, flat, annular surfaces integrally formed thereon at precisely spaced intervals therealong, screw means mounting said bar on said member for rotative movement of the bar with respect to the member and along the axis of the bar, means indicating the extent of such axial movement, and releasable means fixing the bar against movement.

RUSSELL E. BAUER.

REFERENCES CITED

The following references are of record in the file of this patent:

UNITED STATES PATENTS

| Number | Name | Date |
|---|---|---|
| 305,337 | Russom | Sept. 16, 1884 |
| 1,317,746 | Whatley | Oct. 7, 1919 |
| 1,431,583 | Johansson | Oct. 10, 1922 |
| 2,135,316 | Whistler et al. | Nov. 1, 1938 |
| 2,200,884 | Hoagland | May 14, 1940 |

Certificate of Correction

Patent No. 2,440,710.  May 4, 1948.

RUSSELL E. BAUER

It is hereby certified that error appears in the printed specification of the above numbered patent requiring correction as follows: Column 2, line 34, for the word "preferably" read *perfectly*; and that the said Letters Patent should be read with this correction therein that the same may conform to the record of the case in the Patent Office.

Signed and sealed this 22nd day of June, A. D. 1948.

[SEAL]

THOMAS F. MURPHY,
*Assistant Commissioner of Patents.*